United States Patent
Murto et al.

(10) Patent No.: US 9,760,891 B2
(45) Date of Patent: Sep. 12, 2017

(54) PROVIDING TARGETED ADVERTISING CONTENT TO USERS OF COMPUTING DEVICES

(75) Inventors: Juhani Murto, Helsinki (FI); Petri Nykänen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 2537 days.

(21) Appl. No.: 11/695,255

(22) Filed: Apr. 2, 2007

(65) Prior Publication Data

US 2008/0243609 A1 Oct. 2, 2008

(51) Int. Cl.
*G06Q 30/00* (2012.01)
*G06Q 30/02* (2012.01)

(52) U.S. Cl.
CPC ......... *G06Q 30/02* (2013.01); *G06Q 30/0242* (2013.01)

(58) Field of Classification Search
USPC .......................................................... 705/14
See application file for complete search history.

(56) References Cited

U.S. PATENT DOCUMENTS

| | | | |
|---|---|---|---|
| 2002/0092019 A1* | 7/2002 | Marcus | 725/37 |
| 2002/0113817 A1 | 8/2002 | Mitsugi | |
| 2002/0120564 A1 | 8/2002 | Strietzel | |
| 2006/0031301 A1* | 2/2006 | Herz et al. | 709/206 |
| 2006/0230350 A1 | 10/2006 | Baluja | |
| 2007/0094304 A1* | 4/2007 | Horner et al. | 707/104.1 |
| 2008/0040728 A1* | 2/2008 | Agrawal | 719/313 |

OTHER PUBLICATIONS

Print Screen page from CNNMoney.Com; Entitled "Google CEO: Free cellphones for all, if . . . "; Nov. 13, 2006; 2 sheets.
Saint-Andre; XMPP Standards Foundation; A Houri; IBM; J Hildebrand; Jabber P et al: "Basic Messaging and Presence Interworking between the Extensible Messaging and Presence Protocol (XMPP) and Session Initiation Protocol (SIP) for Instant Messaging and Presence Leveraging Extensions (SIMPLE); draft—saintandre-xmpp-simple-09.txt"; IETF Standard-Working-Draft, Internet Engineering Task Force, IETF, CH, No. 9, Feb. 28, 2007 (Feb. 28, 2007), XP015050371 ISSN: 0000-0004 abstract.
International Search Report for International Application No. PCT/IB2008/000433 completed Jun. 11, 2008.

* cited by examiner

*Primary Examiner* — Alvin L Brown
(74) *Attorney, Agent, or Firm* — Ditthavong & Steiner, P.C.

(57) ABSTRACT

A system for providing a user with advertising content is provided. The system includes a presence server, an advertising distribution server, and a profiling and targeting component that interact to provide one or more advertisement objects to a user of a computing device based on presence data generated by the user. The presence server receives presence notification messages from the user's computing device and transmits the presence data to the profiling and targeting component. The profiling and targeting component in turn defines an advertising package that directs the transmittal of advertisement objects from the advertising distribution server to the user's computing device. The profiling and targeting component may also create a user profile based on the presence data for defining the advertising package and may further determine a trend of the user based on historical presence data. A method, apparatus, and computer program product are also provided.

30 Claims, 5 Drawing Sheets

PROVIDING TARGETED ADVERTISING CONTENT TO USERS OF COMPUTING DEVICES

TECHNOLOGICAL FIELD

Embodiments of the present invention relate generally to communications technology and, more particularly, to the provision of targeted advertising content to users of computing devices using presence data transmitted over a communications network.

BACKGROUND

For thousands of years, people have relied on advertising to learn about new products and new opportunities on the market. From town criers and notices posted outside taverns, to radio spots and highway billboards, the concept of advertising has remained essentially the same: to promote the sale of a product or service. What has changed through the years is the volume of advertising messages presented to consumers and the number of products and services that are available.

Although part of the goal of advertising is to reach as many people as possible, the proliferation of advertisements has caused some people to find ways to avoid exposure to advertising content all together. Radio stations are switched over at the first indication of a commercial message, televisions are muted or fast-forwarded through commercials, and software is installed on computers to prevent advertisements from being received. In addition to avoiding advertising content related to goods in which the consumer has no interest, however, such measures also keep the consumer from learning about products and services that may be useful to the consumer.

Along with increases in the volume of advertisements, advances in technology have also affected how people communicate with each other. "Presence" is a term used to describe a technology that enables the user of a telecommunications network to convey his status, for example his ability and willingness to communicate, to a potential communication partner. For instance, the user of a mobile terminal such as a cellular telephone may publish her presence state to indicate that she is done with her work day and would like to go out for dinner. Potential communication partners in this example may be a group of the user's friends who have received the user's permission to view her presence data. As a result of the user's published presence status, she may receive messages from two of her friends indicating that they will be free for dinner in half an hour, and the user and her friends may arrange to meet at a particular restaurant at that time. The user may update her presence data as often or as infrequently as she prefers and may include as much or as little information as she desires. In this way, each published presence state provides a picture of the needs and concerns of the user at a particular point in time.

BRIEF SUMMARY

An apparatus, method, computer program product, and system are therefore provided for providing a user with advertising content based on the user's presence data. Thus, the users of computing devices may receive advertising content that may be targeted to the users' needs and interests based on presence data provided by the users.

In one exemplary embodiment, an apparatus for providing a user with advertising content is provided. The apparatus includes a processing element configured to accumulate presence data associated with the user of at least one computing device over a period of time. The processing element is further configured to define at least one advertising package based on the accumulated presence data associated with the user and is configured to direct delivery of at least one advertisement object according to the advertising package.

The processing element may be configured to accumulate presence data that is associated with a pseudonym that identifies a computing device to which the at least one advertisement object is to be directed. The processing element may also be configured to create a user profile based on the accumulated presence data that describes one or more characteristics of the user during the period of time. The advertising package(s) may be defined based on the user profile. The processing element may further be configured to compare the user profile with other user profiles corresponding to other users with whom the user is able to share presence data. In this way, the processing element may be configured to define the advertising package(s) to include as recipients of the advertisement object(s) the other users having matching or partially matching user profiles.

The processing element may also be configured to accumulate multiple instances of presence data and to determine a trend of the user from the instance of presence data. The advertising package(s) may then be defined according to the determined trend. Furthermore, the processing element may be configured to accumulate presence data from a plurality of different presence contexts.

In other exemplary embodiments, a method and computer program product for providing a user with advertising content are provided. The method and computer program product accumulate presence data associated with a user of at least one computing device over a period of time, define at least one advertising package based on the accumulated presence data associated with the user, and direct delivery of at least one advertisement object according to the advertising package. The presence data may be associated with a pseudonym that identifies a computing device to which the at least one advertisement object is to be directed.

A user profile may be created based on the accumulated presence data. The user profile may describe one or more characteristics of the user during the period of time, and the advertising package(s) may be defined based on the user profile. Also, the user profile may be compared with other user profiles corresponding to other users with whom the user is able to share presence data, and the advertising package(s) may be defined to include as recipients of the at least one advertisement object the other users having matching or partially matching user profiles.

Multiple instances of presence data may be accumulated in some embodiments. A trend of the user may be determined from the instances of presence data, and the advertising package(s) may be defined according to the trend. In addition, presence data from a plurality of different presence contexts may be accumulated. Furthermore, a request may be received from the at least one computing device for advertising content, and delivery of the advertisement object may be caused in response to the request.

In another exemplary embodiment, an apparatus for providing a user with advertising content is provided that includes means for accumulating presence data associated with a user of at least one computing device over a period of time. The apparatus of this embodiment also includes means for defining at least one advertising package based on the accumulated presence data and associated with the user and means for directing delivery of at least one advertisement object according to the advertising package.

In another exemplary embodiment, a system for providing a user with advertising content is provided. The system includes a presence server, an advertising distribution server, and a profiling and targeting component that interact to provide one or more advertisement objects to a user based on presence data. The presence server is connected to a communications network and configured to receive and transmit presence notification messages from and to a plurality of computing devices communicating over the network. The presence notification messages include presence data associated with a user of a first computing device from among the plurality of computing devices. The presence server is also configured to transmit the presence data to the profiling and targeting component.

The profiling and targeting component is connected to the network and configured to communicate with the presence server and the advertising distribution server. The profiling and targeting component is configured to receive and accumulate the presence data from the presence server during a period of time, to define at least one advertising package based on the presence data, and to transmit the advertising package(s) to the advertising distribution server.

The advertising distribution server is connected to the network and configured to store a plurality of advertisement objects. The advertising distribution server is configured to receive the advertising package(s) from the profiling and targeting component and to select at least one advertisement object from among the plurality of advertisement objects based on each advertising package. The advertising distribution server is further configured to transmit the one or more advertisement objects to the user of the first computing device such that each advertisement object is targeted to the user of the first computing device based on the accumulated presence data.

The presence server may be configured to receive presence notification messages according to a Session Initiation Protocol for instant messaging and Presence Leveraging Extensions (SIMPLE) and/or an Extensible Messaging and Presence Protocol (XMPP), among other suitable protocols. Furthermore, the presence server may be configured to transmit presence notification messages received from the user of the first computing device to the user of a second computing device. The presence notification messages may be associated with a pseudonym that identifies the first computing device, and the presence server may be configured to remove the pseudonym when transmitting the presence notification message to the second computing device.

In some embodiments, the profiling and targeting component may be configured to create a user profile based on the presence data received from the presence server. The user profile may describe one or more characteristics of the user of the first computing device during the period of time, and the profiling and targeting component may be configured to define the advertising package(s) based on the user profile. The profiling and targeting component may be configured to compare the user profile with other user profiles corresponding to other users with whom the user is able to share presence data, and the processing element may be configured to define the advertising package(s) to include as recipients of the advertisement object(s) the other users having matching or partially matching user profiles.

The profiling and targeting component may also be configured to accumulate multiple instances of presence data and to determine a trend of the user from the instances of presence data. The advertising package(s) may be defined according to the trend. Furthermore, the profiling and targeting component may be configured to accumulate presence data from a plurality of different presence contexts.

The advertising distribution server may be configured to transmit the advertisement object(s) to the first computing device in real time or near real time with respect to the time at which the presence notification message was received at the presence server.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
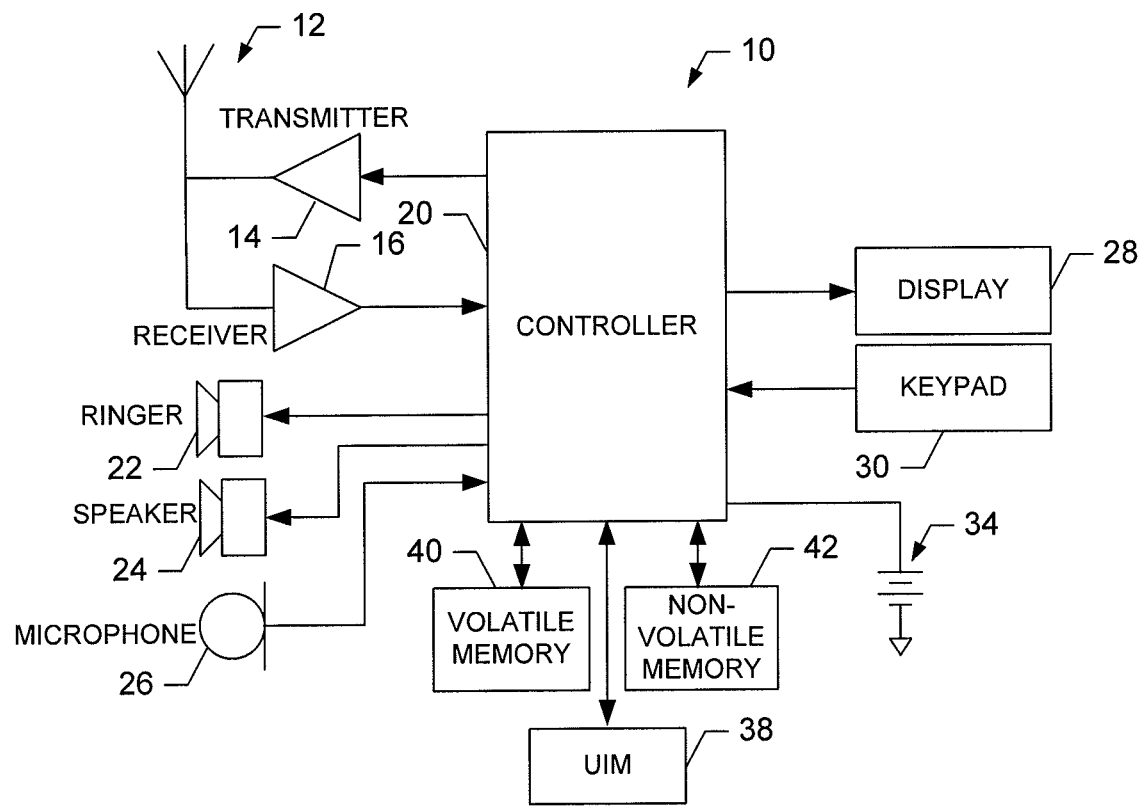
FIG. 1 is a schematic block diagram of a mobile terminal according to an exemplary embodiment of the present invention.

Embodiments of the present inventions now will be described more fully hereinafter with reference to the accompanying drawings, in which some, but not all embodiments of the inventions are shown. Indeed, embodiments of these inventions may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from the present invention. It should be understood, however, that a mobile telephone as illustrated and hereinafter described is merely illustrative of one type of mobile terminal that would benefit from the present invention and, therefore, should not be taken to limit the scope of the present invention. While several embodiments of the mobile terminal 10 are illustrated and will be hereinafter described for purposes of example, other types of mobile terminals, such as portable digital assistants (PDAs), pagers, mobile televisions, laptop computers and other types of voice and text communications systems, can readily employ the present invention.

In addition, while several embodiments of the method of the present invention are performed or used by a mobile terminal 10, the method may be employed by other than a mobile terminal. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries. For example, personal computers or other computer workstations, or indeed, any electronic device involving hardware and software elements via which a user establishes network communications would similarly benefit from the present invention. Accordingly, the present invention should not be construed as being limited to applications in the mobile communications industry.

The mobile terminal 10 includes an antenna 12 in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA) or third-generation wireless communication protocol Wideband Code Division Multiple Access (WCDMA).

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 includes the conventional numeric (0-9) and related keys (#, *), and other keys used for operating the mobile terminal 10. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
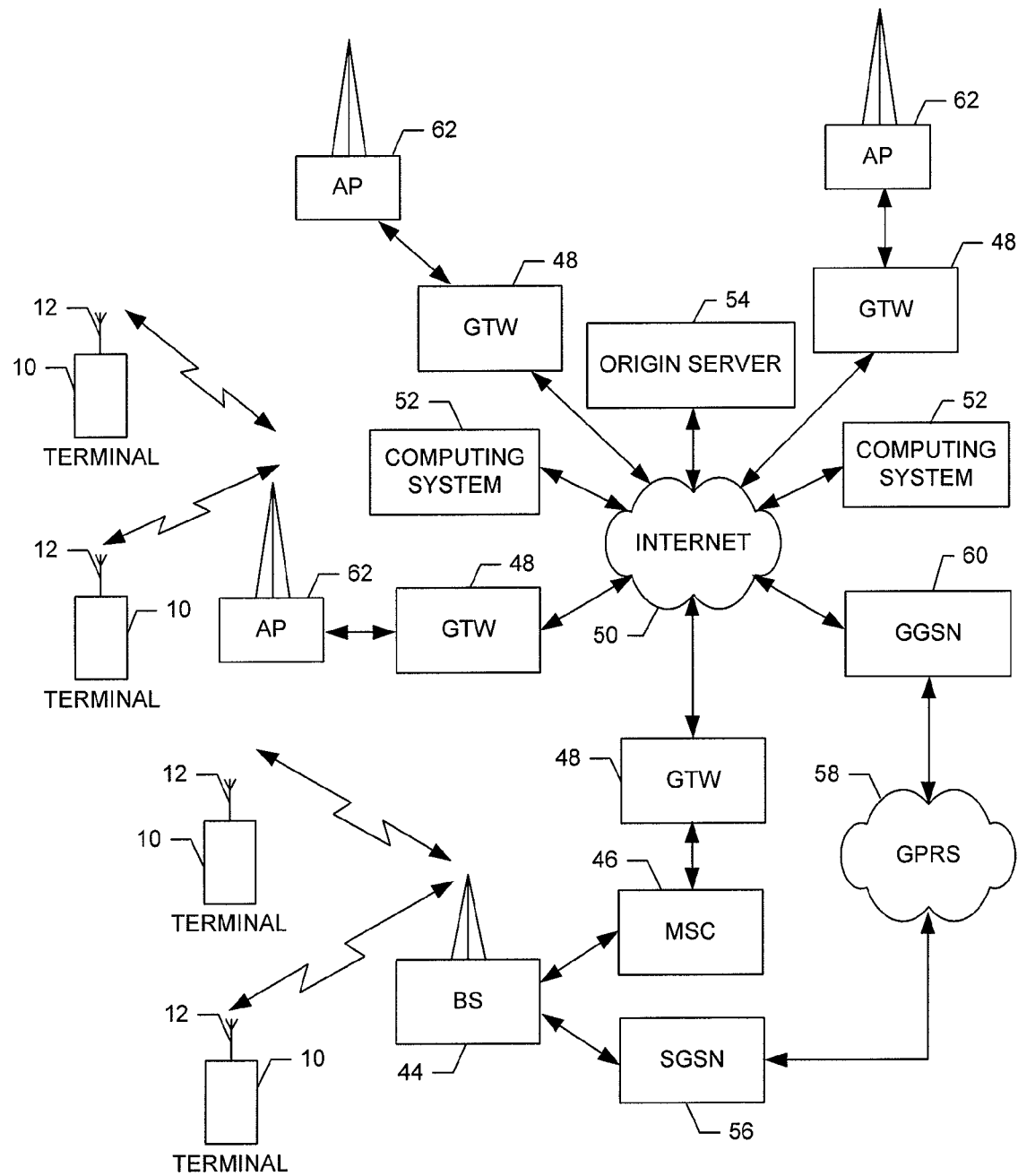
FIG. 2 is a schematic block diagram of a wireless communications system according to an exemplary embodiment of the present invention.

Referring now to FIG. 2, an illustration of one type of system that would benefit from embodiments of the present invention is provided. The system includes a plurality of network devices, any of which may employ embodiments of the present invention. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G, third-generation (3G) and/or future mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

Figure 3:
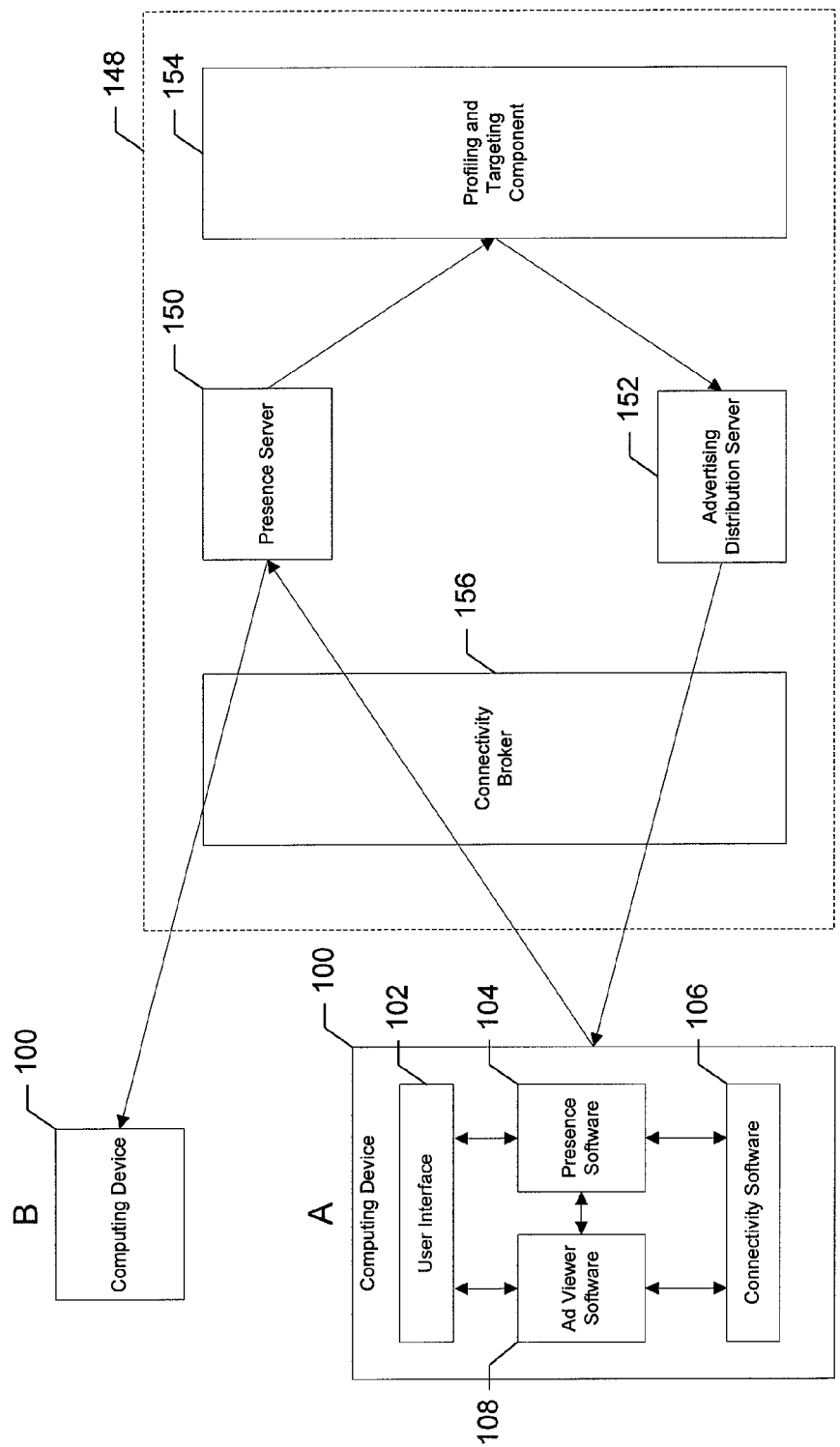
FIG. 3 is a schematic block diagram showing the interaction of various network elements with computing devices according to an exemplary embodiment of the present invention.

An exemplary embodiment of the invention will now be described with reference to FIG. 3, in which certain elements of a system 148 for providing a user with advertising content are displayed. The system of FIG. 3 may communicate, for example, via the network of FIG. 2 as indicated by the link between the advertising system 148 and the Internet 50, or other network, in FIG. 2. However, it should be noted that the system of FIG. 3, may also be employed in a variety of other networks, both mobile and fixed, and therefore, embodiments of the present invention should not be limited to the network of FIG. 2. As also shown in FIG. 3, the advertising system 148 is configured to communicate with one or more computing devices 100. In this regard, the term computing device 100 will be used to refer to mobile terminals 10, computing systems 52 (mobile or fixed), and other devices that are capable of receiving presence data from a user and communicating the presence data via a network to the advertising system 148.

Referring now to FIG. 3, a system 148 for providing a user with advertising content is provided. The system of one embodiment includes a presence server 150, an advertising distribution server 152, and a profiling and targeting component 154. While these elements are shown as discrete but interconnected components in FIG. 3, two or all three of these components may be embodied in a single device, such as a single computing device, e.g., a single server, in other embodiments. The profiling and targeting component 154 may include various means for performing its functions that are described below. In one embodiment, each means is embodied by a computing device, such as a server, a computer, a processor, or some portion thereof.

The presence server 150 is configured to receive and transmit presence notification messages from and to a number of computing devices 100 communicating over a communications network, such as that shown in FIG. 2. For example, the presence server 150 of FIG. 3 is configured to receive presence notification messages from user A's computing device 100 and to transmit presence notification messages to user B's computing device 100. In some embodiments, the presence server 150 may include a database configured to store presence notification messages received from different users.

Presence notification messages include presence data, which may be data describing certain characteristics of the user such as the user's mood, activities, status (on-line or off-line), notes to other users able to view this information, and other user-defined presence data. The presence notification messages may be communicated according to different presence data formats and protocols, such as SIMPLE (Session Initiation Protocol for Instant Messaging and Presence Leveraging Extensions) and XMPP (Extensible messaging and Presence Protocol). While the presence data may be provided in various formats, it is noted that attempts have been made to standardize formats for presence information. For example, RFC 3863 defines basic presence data formats for presence data distribution and handling, and RFC 4480 defines extensions to the basic presence data formats defined in RFC 3863 to enable advanced presence applications.

Referring again to FIG. 3, the user A of a computing device 100 participating in a presence service offered by his network provider, for example, may update his presence data to reflect that he is hungry and would like to have Italian food for dinner. Such an update may be sent as a presence notification message from A's computing device 100 to the presence server 150. In particular, A may input his presence data using a user interface 102 of his computing device 100. The user interface 102 may be a keypad, a touch display, or any other type of user interface, such as described in conjunction with the mobile terminal of FIG. 1. The inputted presence data may be formatted for communication to the presence server 150 by presence software 104 executed by user A's computing device, such as its controller. For example, the presence software 104 may convert the presence data text entered by the user via the user interface 102 to a presence notification message in accordance with a SIMPLE or XMPP protocol that can be understood by the presence server 150, which may be configured to receive presence notification messages according to these protocols, among other protocols. The presence notification message may then be transmitted to the presence server 150 via connectivity software 106 that serves as an interface between the computing device 100 and elements of the advertising system 148, including the presence server 150. Furthermore, a connectivity broker 156 may enable server-side connectivity between the computing device 100 and the other elements of the advertising system 148. As such, the connectivity broker 156 may be configured to enable communication of the presence server 150 with the computing devices 100, as well to enable communication of the advertising distribution server 152 with the computing devices 100, as will be discussed below.

The presence server 150 may in turn provide user A's updated presence data to other users for viewing by transmitting the presence notification messages received from user A to the computing devices 100 of the other users. For example, user B may be one of several users capable of accessing user A's presence data in one or more presence contexts. User B, along with other users, may have requested access from user A to view user A's presence data, and user A may have granted such access. In this way, user B may belong to a group of subscribers who have access to some or all of user A's presence data, the group of users sometimes referred to as a "buddy list." User A may have more than one "buddy list," each group having rights to access presence data from a different presence context. For example, some users may belong to a "buddy list" in the presence context of "work," which may have rights to view user A's presence data relating to work. Other users may have access to a different presence context, such as "friends," which may relate to activities and events outside of user A's work. Yet another presence context may be "vacation club" or "golfing," and so on. The presence context may be defined by user A, and users may have access to presence data in more than one presence context. For example, user B may be on the "buddy list" for the presence context of "friends" as well as for "vacation club," but not for "work" or "golfing."

Each presence notification message generated by a user, such as user A in FIG. 3, may be associated with a presence identity that identifies the user generating the presence data. For example, user A may have a presence identity of "NiceGuy," and other users viewing user A's presence data and seeing that the presence data was generated by "NiceGuy" can recognize that the presence data describes user A. In this way, user A can identify his presence data even if user A uses different computing devices 100 to enter his presence data. For example, user A may input updates to his presence data using a computer at work during his lunch break. Upon leaving work, user A may use his cellular telephone to enter additional updates to his presence data. Once user A is at home, he may enter further updates to his presence data using his personal laptop computer. However, because user A's presence data is associated with his presence identity "NiceGuy," other users such as user B can recognize the updates as user A's, regardless of which computing device 100 (work computer, cellular telephone, or personal laptop) was used to input the updates. Furthermore, a user's presence identity may vary from one presence context to the next. For example, user A may have a presence identity of "NiceGuy" in the presence context of "friends" while having a presence identity of "FineWorker" in the presence context of "work."

In addition to user A's presence identity, each presence notification message may be associated with a pseudonym. Unlike the presence identity, which may be chosen by user A to identify him to subscribers to his various presence contexts, the pseudonym may be assigned by the communications network and may identify the computing device 100 to which the one or more advertisement objects are to be directed. For example, the connectivity software 106 may assign a pseudonym to the user's computing device 100, such as upon the user's first transmission of presence data or the first time the user's presence data is used to provide targeted advertisement objects. In other words, the pseudonym may identify the computing device 100 from which the user made his presence data updates such that advertisement objects based on the user's presence data are directed to that same computing device 100. Thus, referring to the previous example, presence notification messages generated by user A using his work computer may be associated with a different pseudonym than presence notification messages generated on user A's cellular telephone or user A's personal laptop computer. However, in some cases, the same pseudonym may be associated with presence data generated by the same user via different computing devices 100 such that the user is able to get the same service (e.g., receive targeted advertising) on multiple devices. Furthermore, the pseudonym may not be accessible to users viewing another user's presence data. For example, prior to transmitting the presence notification message generated by user A to user B's computing device 100, the presence server 150 may strip the pseudonym from the message, thereby sending only the presence notification message and the presence identity to user B's computing device 100.

Presence notification messages received by the presence server 150 may be sent, along with the associated pseudonym and presence identity, to the profiling and targeting component 154. The profiling and targeting component 154 is configured to receive and accumulate presence data from the presence notification messages received from the presence server 150 during a period of time. Referring to a previous example, the profiling and targeting component 154 may receive over the course of one day presence data communicated to the presence server 150 from user A through three presence notification messages. The profiling and targeting component 154 may accumulate the presence data from the three presence notification messages and analyze such data to define one or more advertising packages that may be transmitted to the advertising distribution server 152.

The advertising distribution server 152 may be configured to store a number of advertisement objects and to select at least one of the advertisement objects to transmit to the computing device 100 associated with the advertising package received from the profiling and targeting component 154 based on instructions provided in the respective advertising package. For example, the advertising distribution server 152 may store a number of advertisements for sporting events in various cities. Upon receiving accumulated presence data indicating that the associated user is on vacation the following week, will be spending time in Olympic City, and is in the mood to watch a basketball game, the profiling and targeting component may define an advertising package directing that the user be sent advertisement objects relating to basketball games in Olympic City during the given week.

The selected advertisement objects may be transmitted from the advertising distribution server 152 to user A's computing device 100 as specified by the advertising package via the connectivity broker 156. The connectivity software 106, which may reside on the computing device 100 as previously mentioned, may facilitate receipt of the advertisement object(s) by advertisement viewer software 108 of the computing device 100. The advertisement viewer software 108 may be configured upon execution by user A's computing device, such as its controller, to control the presentation of the advertisement to user A, for example controlling the display of the advertisement through the user interface 102. In some embodiments, the advertising distribution server 152 is configured to transmit the advertisement object(s) to the computing device 100 in real time or near real time with respect to the time at which the presence notification message was received at the presence server 150. In other words, user A may receive an advertisement object at his computing device 100 shortly after user A may have updated the presence data on which the advertisement object was based. In this way, the advertisement object may retain its relevancy to the user's needs even though the user's needs may be transient (e.g., the user may only be hungry for dinner for twenty minutes before finding a place to eat). In other embodiments, the advertising system 148 may receive a request from the computing device 100 for advertising content, and the request may trigger the delivery of the one or more advertisement objects.

The advertisement objects may include text messages, voice messages, video advertisements, picture advertisements, and the like, and the type of advertisement object (in addition to the content) may also be specified by the advertising package defined by the profiling and targeting component 154. For example, the profiling and targeting component 154 may specify the type of advertising object based on the type of computing device currently employed by a user, such as determined by the pseudonym. In this regard, the profiling and targeting component 154 may recognize the associated pseudonym as identifying user A's cellular telephone, and so the profiling and targeting component 154 may specify that a text message or voice message be transmitted by the advertising distribution server 152 to user A's computing device 100 (in this case, a cellular telephone) rather than a video advertisement. In this way, user A may receive advertisement objects that are relevant to his needs and targeted to his interests according to the information user A provides in his presence notification messages.

In some embodiments, the profiling and targeting component 154 is configured to create a user profile based on the presence data received from the presence server 150. Various data mining techniques may be used to create the user profile based on the user's presence data. In this way, the user profile may describe one or more characteristics of the user during the period of time and may in turn be used to define the advertising package(s) to be transmitted to the advertising distribution server 152.

Figure 4:
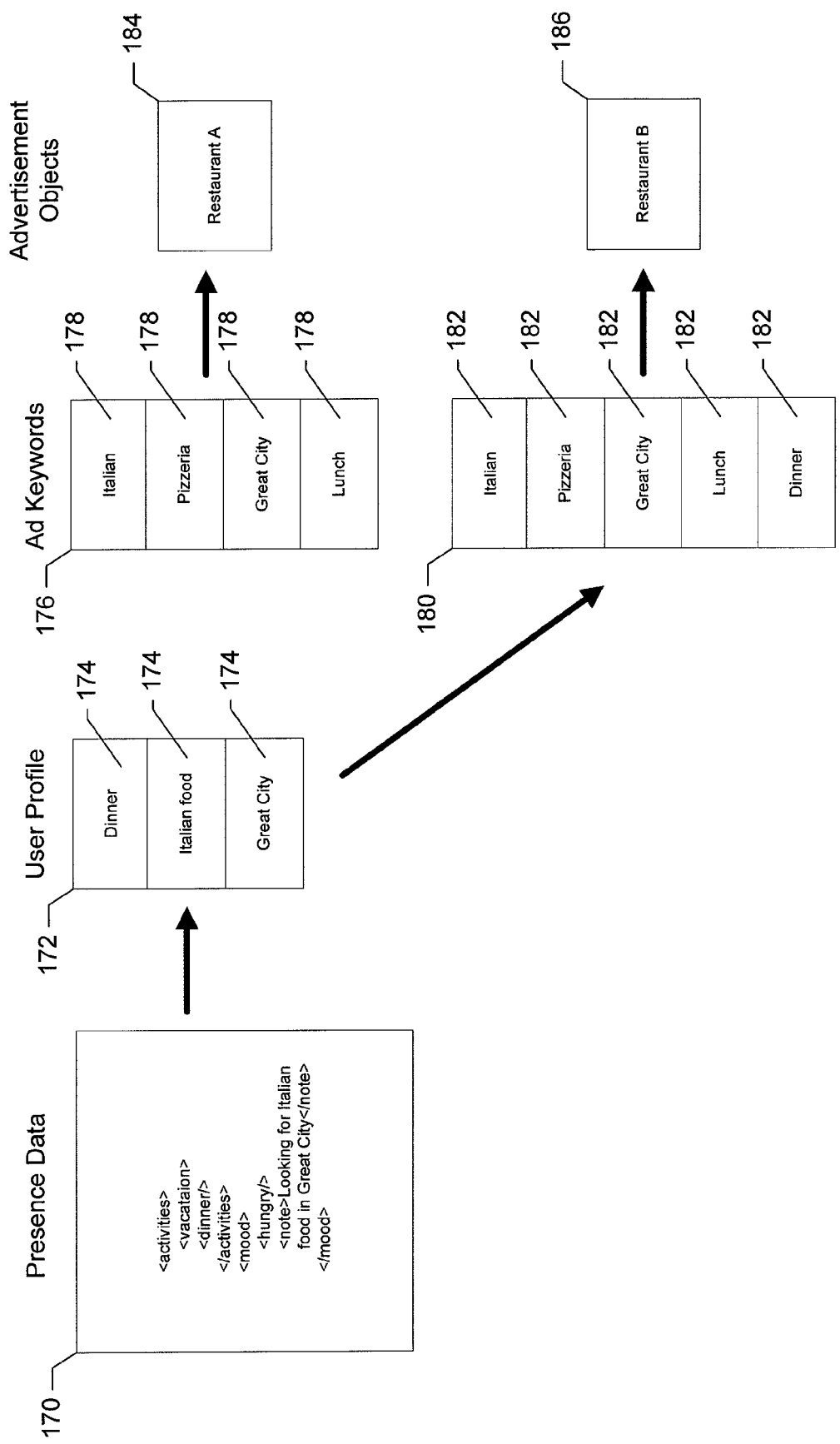
FIG. 4 illustrates the selection of advertisement objects through the creation of a user profile according to an exemplary embodiment of the present invention.

FIG. 4 shows an example of the selection of an advertisement object 186, based on presence data 170 provided by a user (such as user A), through the use of a user profile 172. In this example, the user's presence data describes his mood as "hungry" and includes a note that he is "Looking for Italian food in Great City." This presence data 170 may be transmitted from the user's computing device 100 to the presence server 150 (see FIG. 3) in the form of a presence notification message, and the presence server 150 may in turn provide the presence notification message to other users such as user B, as previously discussed. The presence server 150 may also transmit the presence notification message with the associated presence identity and pseudonym to the profiling and targeting component 154. In the example shown in FIG. 4, the profiling and targeting component may create a user profile 172 based on the presence data 170 to describe one or more characteristics of user A. In this case, the user profile 172 may include profile terms 174 including "Dinner," "Italian food," and "Great City."

The user profile 172 may then be matched with advertising keyword sets 176, 180, each advertising keyword set 176, 180 including keywords 178, 182 that describe a particular advertisement object 184, 186. For example, one advertising keyword set 176 describing an advertisement object 184 for "Restaurant A" may include the keywords 178 "Italian," "Pizzeria," "Great City," and "Lunch." Another advertising keyword set 180 describing an advertisement object 186 for "Restaurant B" may include the keywords 182 "Italian," "Pizzeria," "Great City," "Lunch," and "Dinner." Matching the profile terms 174 with the advertising keyword set 180 having the most matching keywords 182, the advertisement object 186 for "Restaurant B" would be selected in this example and transmitted from the advertising distribution server 152 to user A's computing device 100.

The advertising keyword sets 176, 180 may be stored in the profiling and targeting component 154 or in the advertising distribution server 152. In the first case, the matching of the profile terms 174 with the keywords 178, 182 may performed by the profiling and targeting component 154, and the associated advertisement objects may be identified in the advertising package defined by the profiling and targeting component 154. Alternatively, if the advertising keyword sets 176, 180 are stored in the advertising distribution server 152, the user profile 172 itself may be incorporated in the advertising package defined by the profiling and targeting component 154, and the advertising distribution server 152 may be configured to match the profile terms 174 with the keywords 178, 182. In any case, the profiling and targeting component 154 is configured to define the advertising packages based on the user profiles.

In some embodiments, the user profile may be compared with other user profiles corresponding to other users with whom the user is able to share presence data, such as subscribers to one or more of the user's "buddy lists." For example, referring to FIG. 3, user B, who may be a subscriber to one or more of user A's "buddy lists," may have a user profile stored on the profiling and targeting component 154, such as a profile created in the process of defining advertising packages and directing advertisement objects as described herein. The profiling and targeting component 154 may compare A's user profile with B's user profile, as well as with the profiles of other users who are subscribers to A's "buddy lists" (e.g., users C, D, E, etc.). The profiling and targeting component 154 may be configured to define the advertising package(s) to include as recipients of the one or more advertisement objects those other users having matching, or at least partially matching, user profiles. Referring to the previous example, users B and D may have user profiles that partially match user A's profile. For example, a predefined number of entries on the matching user profiles may be the same as or similar to user A's entries (e.g, the same hobbies or the same interest in going to dinner on Friday nights). As a result, the profiling and targeting component 154 may define an advertising package to include users B and D (for example, by including B and D's pseudonyms) as recipients of the advertisement objects to be transmitted by the advertising distribution server to user A. In this way, users A, B, and D would all receive the same or similar advertising content, for example based on the matching presence data included in their respective user profiles.

In some embodiments, the profiling and targeting component 154 is configured to accumulate multiple instances of presence data and to determine a trend of the user from the instances of presence data. For example, the profiling and targeting component 154 may be configured to accumulate a certain number of instances, each instance of presence data representing an update by the user of his presence data. In the prior example in which user A updated his presence data at work, on the way home, and at home, user A generated three instances of presence data, although each instance may have been associated with a different pseudonym (i.e., each instance may have been generated using a different computing device 100). Likewise, another user may update her presence data once every day using her cellular telephone. In this case, over the span of two weeks the profiling and targeting component 154 may accumulate 14 instances of presence data. Similarly, the profiling and targeting component 154 may be configured to accumulate instances of presence data over a predetermined period of time, such as two weeks, a month, or longer.

In any case, through the accumulation of multiple instances of presence data and the association of each instance with the user, the profiling and targeting component 154 may determine a trend of the user, such as a pattern in the user's behavior. For example, the accumulation of instances may show that every Saturday afternoon the user generates presence data reflecting that she wishes to go to the cinema. In this case, the profiling and targeting component 154 may determine a trend of the user to see a movie on Saturday nights and, as a result, may define one or more advertising packages according to this trend. Thus, the profiling and targeting component 154 may define an advertising package directing the transmission of advertisement objects relating to, for example, movie tickets and concessions to the user's computing device 100. In this way, the user may receive such advertisement objects even if the user has not updated her presence data to reflect that she wants to go to a movie Saturday night.

Furthermore, the profiling and targeting component 154 may be configured to accumulate presence data from more than one presence context. For example, the profiling and targeting component 154 may receive presence data that was generated by user A for access by other users subscribing to user A's "work" context. Such presence data may, for example, include the fact that user A will be traveling to Capitol City the following week on business. The profiling and targeting component 154 may also receive presence data generated by user A in the "friends" presence context. This presence data, accessible to users on the "friends" buddy list, may include user A's notes that he hopes to have time to visit some museums the following week. The profiling and targeting component 154 may be configured to accumulate user A's presence data from both the "work" presence context and the "friends" presence context and, as a result, may define an advertising package directing the transmission of advertisement objects relating to museums and other attractions in Capitol City. In other words, the profiling and targeting component 154 may be configured to combine the presence data received from multiple different presence contexts to define an advertising package targeted to the user's needs and interests.

Figure 5:
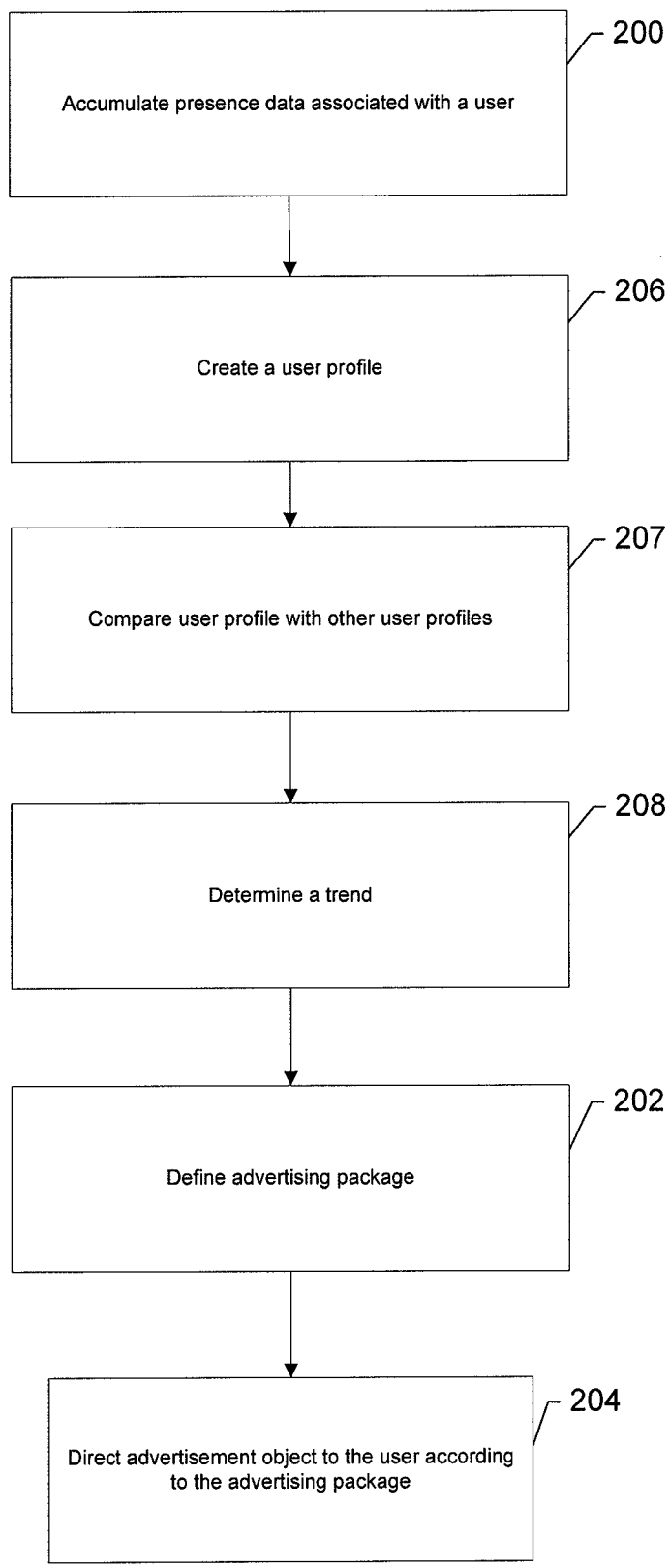
FIG. 5 illustrates a flowchart according to an exemplary embodiment for providing a user with advertising content.

In other embodiments, a method for providing a user with advertising content is provided. Referring to FIG. 5, presence data associated with a user of a computing device is accumulated over a period of time. One or more advertising package is then defined based on the accumulated presence data and associated with the user, and at least one advertisement object is directed to the user according to the advertising package. See FIG. 5, blocks 200-204.

As previously discussed, the presence data that is accumulated may be associated with a pseudonym that identifies a computing device to which the advertisement object is to be directed. The pseudonym may also be associated with the advertising package(s) and the advertisement object(s) resulting from the accumulation of the presence data. In this way, the advertisement object(s) may be transmitted to the user at the computing device identified by the pseudonym.

In some embodiments, a user profile may be created based on the accumulated presence data, as shown in block 206. The user profile, discussed above, may describe one or more characteristics of the user during the period of time. For example, the user profile may include profile terms describing the mood of the user, such as "hungry" or "tired of work," or may include interests and activities of the user, among other things, derived from the presence data, such as through data mining techniques. The user profile may then be used to define the advertising package(s), for example by matching or partially matching the profile terms with advertising keywords describing certain advertisement objects. See block 202. Also, the user profile may be compared with other user profiles corresponding to other users with whom the user is able to share presence data (block 207), and the other users having matching or partially matching user profiles may be included as recipients of the one or more advertisement objects when the advertising package(s) are defined.

Furthermore, multiple instances of presence data may be accumulated. Block 200. Each instance of presence data may, for example, represent one entry or update of presence data by the user. Thus, as previously described, over a period of time a user may generate several instances of presence data. Based on the multiple instances of presence data, a trend of the user may be determined, as shown in block 208. For example, it may be determined that a user generally eats dinner at a restaurant with friends on Wednesday nights. The advertising package(s) may then be defined according to the trend. Block 202. In this way, the needs or interests of the user may be anticipated and targeted by appropriate advertisement objects based on historic presence data.

Similarly, presence data may be accumulated from a number of different presence context. See block 200. For example, presence data directed to subscribers of one presence context, such as "work," may be accumulated along with presence data directed to other subscribers of a different presence context, such as "golfing." In this way, one or more advertising packages may be defined based on the presence data from both presence contexts in this example, and the resulting advertisement objects that are directed to the user may target the total needs and interests of the user across several presence contexts. Furthermore, a request for advertising content may be received from the computing device, and delivery of the advertisement objects may be triggered in response to the request. Block 204.

Exemplary embodiments of the present invention have been described above with reference to block diagrams and flowchart illustrations of methods, apparatuses, systems, and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus, such as the controller 20 in FIG. 1, to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
at least one processor; and
at least one memory including computer program code for one or more programs,
the at least one memory and the computer program code configured to, with the at least one processor, cause the apparatus to perform at least the following,
accumulate, over a period of time, user-defined presence data associated with a user of at least one computing device, wherein the user-defined presence data identifies one or more characteristics of the user, and is provided by the user for distributing to one or more other users authorized to access the user-defined presence data;
create a user profile for the user based, at least in part, on the accumulated user-defined presence data;
define at least one advertising package based at least in part on the user profile; and
direct delivery of at least one advertisement object according to the advertising package.

2. The apparatus of claim 1, wherein the accumulated user-defined presence data is associated with one or more pseudonyms, each identifying at least one computing device to which the at least one advertisement object is to be directed.

3. The apparatus of claim 1, wherein the user profile describes one or more characteristics of the user during the period of time.

4. The apparatus of claim 1, wherein the apparatus is further caused to:
compare the user profile with a user profile corresponding to each of the one or more other users, and
define the at least one advertising package to include at least one of the one or more other users as recipients of the at least one advertisement object based at least in part on the comparison.

5. The apparatus of claim 1, wherein the apparatus is further caused to:
accumulate multiple instances of the user-defined presence data,
determine a trend of the user from the multiple instances of the user-defined presence data, and
define the at least one advertising package based at least in part on the trend.

6. The apparatus of claim 1, wherein the user-defined presence data is accumulated from a plurality of different presence contexts.

7. A method comprising:
accumulating, over a period of time at a device, user-defined presence data associated with a user of at least one computing device, wherein the user-defined presence data identifies one or more characteristics of the user, and is provided by the user for distributing to one or more other users authorized to access the user-defined presence data;
creating a user profile for the user based, at least in part, on the accumulated user-defined presence data;
defining, at the device, at least one advertising package based at least in part on the user profile; and
directing delivery of at least one advertisement object according to the advertising package.

8. The method of claim 7, wherein the accumulated user-defined presence data is associated with one or more pseudonyms, each identifying at least one computing device to which the at least one advertisement object is to be directed.

9. The method of claim 7 wherein the user profile describes one or more characteristics of the user during the period of time.

10. The method of claim 7 further comprising comparing the user profile with a user profile corresponding to each of the one or more other users, and defining the at least one advertising package to include at least one of the one or more other users as recipients of the at least one advertisement object based at least in part on the comparison.

11. The method of claim 7, wherein accumulating the user-defined presence data comprises accumulating multiple instances of the user-defined presence data, and wherein the defining at least one advertising package further comprises determining a trend of the user from the multiple instances of the user-defined presence data and the defining the at least one advertising package is based at least in part on the trend.

12. The method of claim 7, wherein the user-defined presence data is accumulated from a plurality of different presence contexts.

13. The method of claim 7, wherein directing delivery comprises receiving a request from the at least one computing device for advertising content and thereafter causing delivery of the at least one advertisement object in response to the request.

14. A non-transitory computer-readable storage medium carrying one or more sequences of one or more instructions which, when executed by one or more processors, cause an apparatus to at least perform the following steps:
accumulating, over a period of time, user-defined presence data associated with a user of at least one computing device, wherein the user-defined presence data identifies one or more characteristics of the user, and is provided by the user for distributing to one or more other users authorized to access the user-defined presence data;
creating a user profile for the user based, at least in part, on the accumulated user-defined presence data;
defining at least one advertising package based at least in part on the user profile; and
directing delivery of at least one advertisement object according to the advertisement package.

15. A non-transitory computer-readable storage medium according to claim 14, wherein the accumulated user-defined presence data is associated with one or more pseudonyms, each identifying at least one computing device to which the at least one advertisement object is to be directed.

16. A non-transitory computer-readable storage medium according to claim 14, wherein the user profile describes one or more characteristics of the user during the period of time.

17. A non-transitory computer-readable storage medium according to claim 16, wherein the apparatus is caused to further perform:
comparing the user profile with a user profile corresponding to each of the one or more other users, and
including as recipients of the at least one advertisement object at least one of the one or more other users based at least in part on the comparison.

18. A non-transitory computer-readable storage medium according to claim 14, wherein the apparatus is caused to further perform:
accumulating multiple instances of the user-defined presence data,
determining a trend of the user from the multiple instances of the user-defined presence data; and
defining the at least one advertising package based at least in part on the trend.

19. A non-transitory computer-readable storage medium according to claim 14, wherein the user-defined presence data is accumulated from a plurality of different presence contexts.

20. A non-transitory computer-readable storage medium according to claim 14, wherein the apparatus is caused to further perform:
receiving a request from the at least one computing device for advertising content; and
determining to deliver the at least one advertisement object in response to the request.

21. An apparatus comprising:
means for accumulating, over a period of time, user-defined presence data associated with a user of at least one computing device, wherein the user-defined presence data identifies one or more characteristics of the user, and is provided by the user for distributing to one or more other users authorized to access the user-defined presence data;
means for creating a user profile for the user based, at least in part, on the accumulated user-defined presence data;
means for defining at least one advertising package based at least in part on the user profile; and
means for directing delivery of at least one advertisement object according to the advertising package.

22. A system comprising:
a presence server connected to a communications network and configured to receive and transmit presence notification messages, wherein the presence notification messages include user-defined presence data associated with a user of a first computing device, and wherein the user-defined presence data identifies one or more characteristics of the user, and is provided by the user for distributing to one or more other users authorized to access the user-defined presence data;
an advertising distribution server connected to the network and configured to store a plurality of advertisement objects; and
a profiling and targeting component connected to the network and configured to communicate with the presence server and the advertising distribution server;
wherein the profiling and targeting component is configured to receive and accumulate the user-defined presence data from the presence server during a period of time, to create a user profile for the user based, at least in part, on the accumulated user-defined presence data, to define at least one advertising package based on the user profile, and to transmit the at least one advertising package to the advertising distribution server; and wherein the advertising distribution server is configured to receive the at least one advertising package from the profiling and targeting component, to select at least one advertisement object from among the plurality of advertisement objects based on each advertising package, and to transmit the at least one advertisement object to the user of the first computing device such that the at least one advertisement object is targeted to the user of the first computing device based on the user profile.

23. The system of claim 22, wherein the presence server is configured to receive presence notification messages according to the protocol selected from the group consisting of a Session Initiation Protocol for Instant Messaging and Presence Leveraging Extensions (SIMPLE) and an Extensible Messaging and Presence Protocol (XMPP).

24. The system of claim 22, wherein the presence server is configured to transmit presence notification messages received from the user of the first computing device to a user of a second computing device.

25. The system of claim 24, wherein the presence server is configured to receive presence notification messages that are associated with a pseudonym that identifies the first computing device and to remove the pseudonym when transmitting the presence notification messages to the user of the second computing device.

26. The system of claim 22, wherein the user profile includes one or more characteristics of the user of the first computing device during the period of time.

27. The system of claim 22, wherein the profiling and targeting component is configured to compare the user profile with a user profile corresponding to each of the one or more other users, and wherein the profiling and targeting component is configured to define the at least one advertising package to include at least one of the one or more other users as recipients of the at least one advertisement object based at least in part on the comparison.

28. The system of claim 22, wherein the profiling and targeting component is configured to accumulate multiple instances of the user-defined presence data, to determine a trend of the user from the multiple instances of the user-defined presence data, and to define the at least one advertising package based at least in part on the trend.

29. The system of claim 22, wherein the user-defined presence data is accumulated from a plurality of different presence contexts.

30. The system of claim 22, wherein the advertisement distribution server is configured to transmit the at least one advertisement object to the first computing device in real time or near-real time with respect to the time at which the presence notification message was received at the presence server.

* * * * *